Nov. 10, 1936. A. E. WIGELSWORTH 2,060,389
METHOD AND APPARATUS FOR DRYING ORGANIC SUBSTANCES
Filed Oct. 7, 1935 3 Sheets-Sheet 3
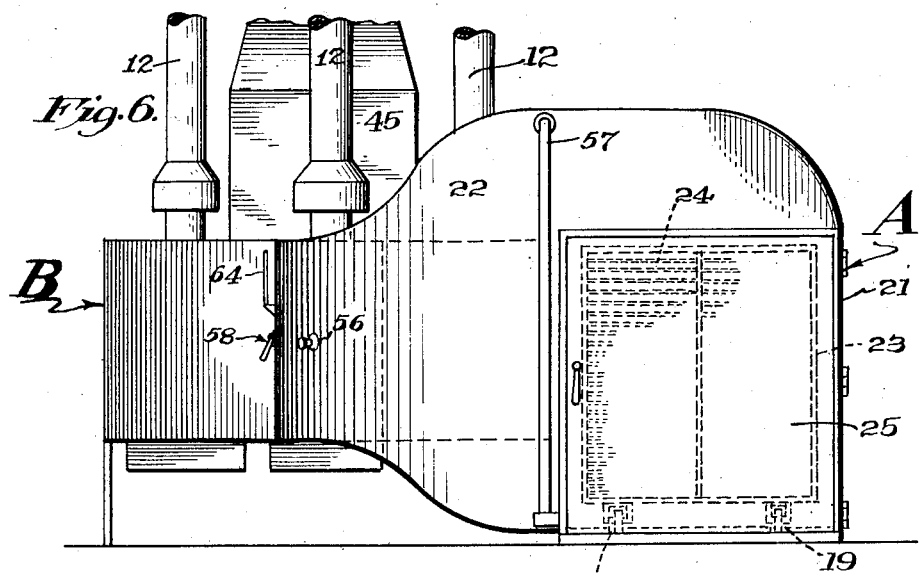
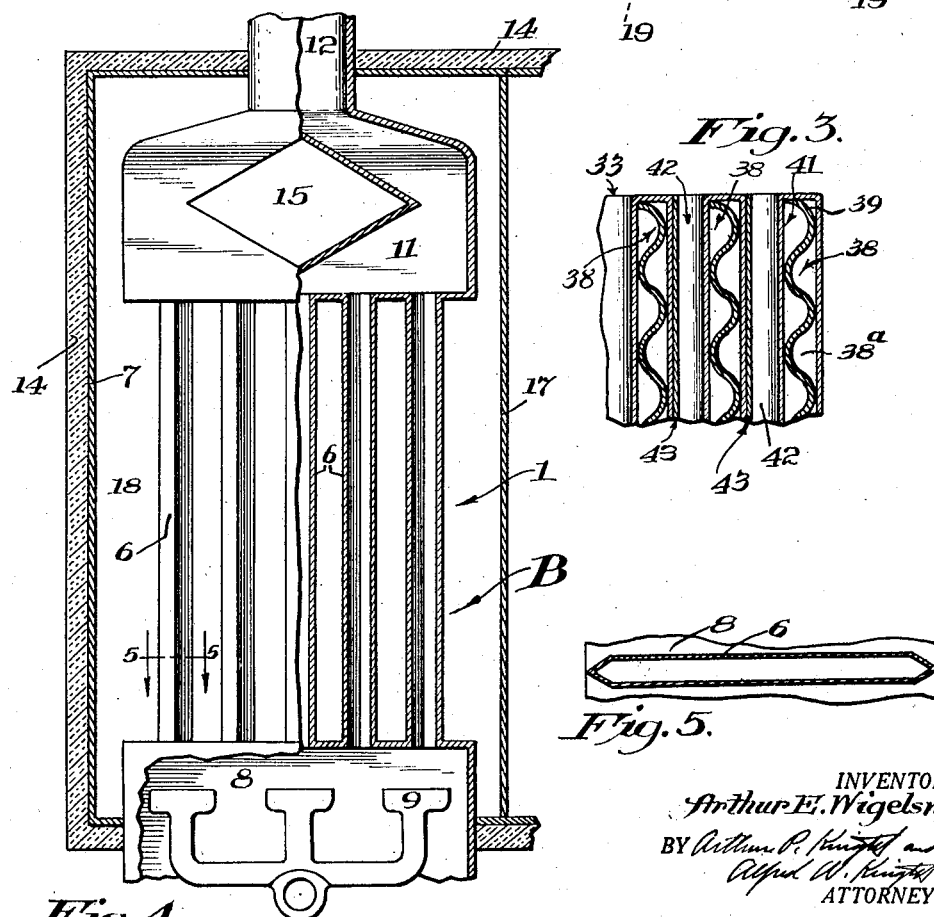
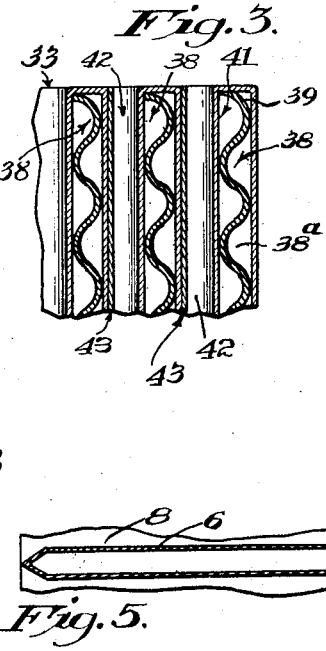
INVENTOR.
Arthur E. Wigelsworth
BY
ATTORNEYS.

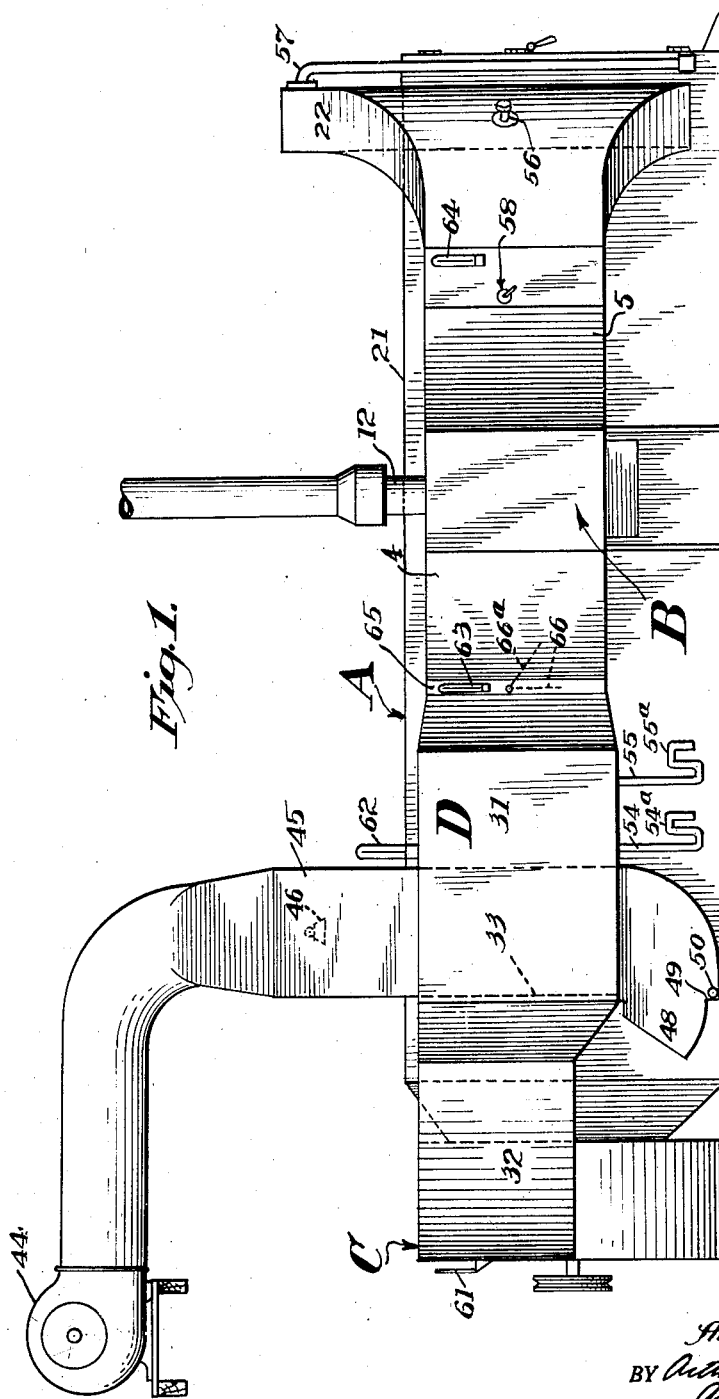

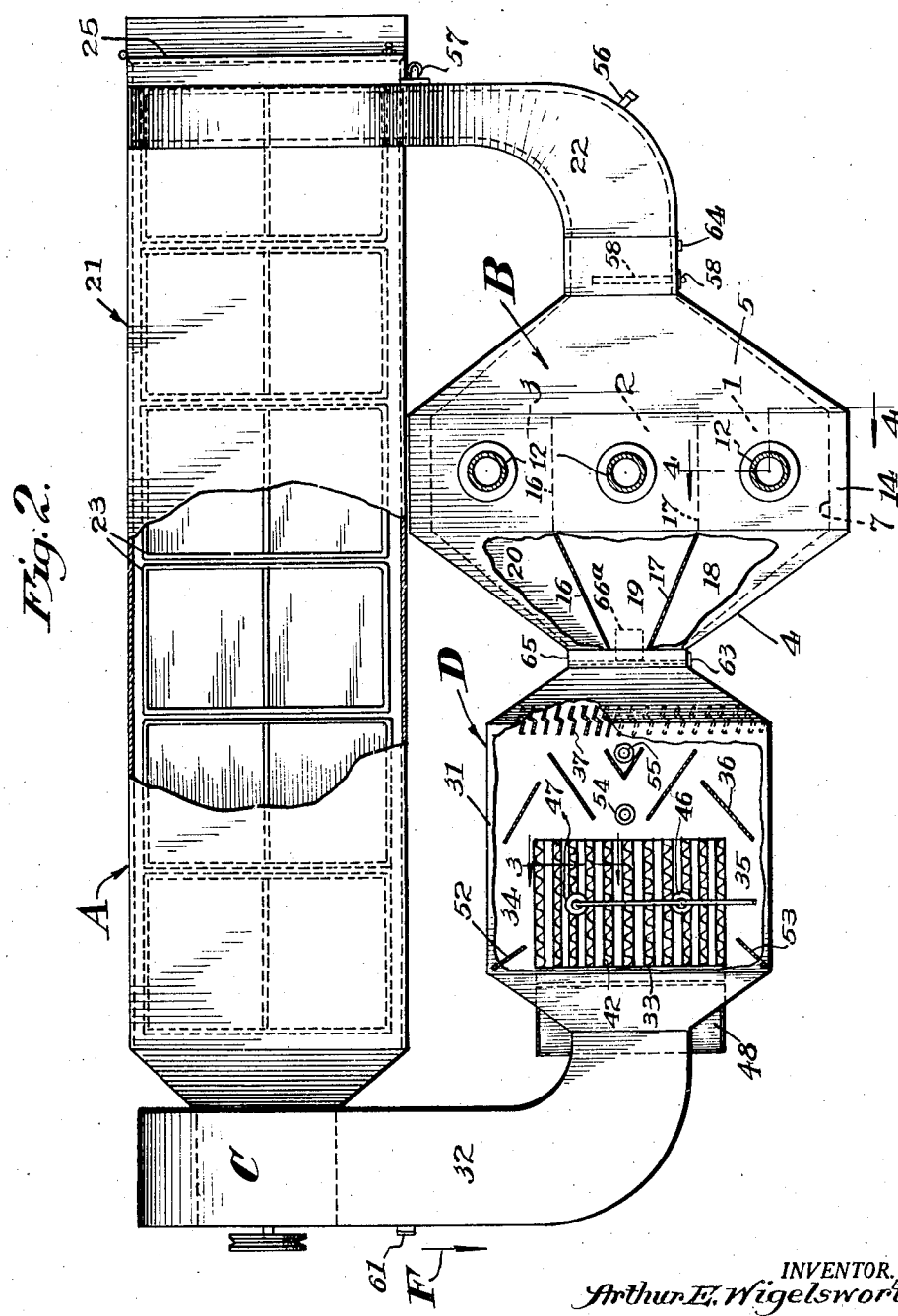

Patented Nov. 10, 1936

2,060,389

UNITED STATES PATENT OFFICE 2,060,389

METHOD AND APPARATUS FOR DRYING ORGANIC SUBSTANCES

Arthur E. Wigelsworth, Los Angeles, Calif.

Application October 7, 1935, Serial No. 43,952

2 Claims. (Cl. 34—3)

This invention relates to a method and apparatus for drying organic materials, and pertains particularly to a method of drying foodstuffs and the like, as well as other organic materials such as condiments, tobacco and the like, in such manner as to produce a dried product possessing the natural properties of such materials to a high degree, and to an apparatus in which such method may be practiced.

Organic materials in general contain certain constituents other than moisture which are subject to loss in the conventional drying procedures, such other constituents comprising, for example, volatile matter important from the standpoint of flavor or aroma, coloring matter such as chlorophyll, and in the case of foods particularly, the accessory food factors such as the vitamins. For the purpose of simplicity, the following description will be directed primarily to the application of the present method to the drying of foodstuffs in such manner as to effect a preservation of the accessory food factor content thereof, as well as the content of coloring and flavoring constituents, to a high degree. It will therefore be comprehended that the several objects of the invention, although referring specifically to the drying of foodstuffs and the preservation of the accessory food factor content thereof, will be interpreted to be equally well directed to the drying of organic materials other than foodstuffs and the preservation therein of such of the above-enumerated constituents as may be present.

In view of the above, the principal object of this invention is to provide a method of and an apparatus for drying foodstuffs and the like under controlled conditions favorable to the preservation of the accessory food factor content thereof, and, in general, for drying organic materials in such manner as to preserve a relatively high proportion of desirable natural constituents thereof.

A further object of the invention is to provide a method of and apparatus for drying foodstuffs and the like in such manner as to preserve to a high degree the accessory food factor content thereof, by establishing and maintaining an advantageous atmosphere in contact with such foodstuff during the entire drying procedure, whereby oxidation and adverse chemical change in such food factors are inhibited to an important extent.

Another object of the invention is to provide a method and apparatus for drying foodstuffs in an acid atmosphere to inhibit oxidation and chemical change thereof during the drying process.

A further object of the invention is to provide a method and apparatus equally well adapted to the drying of liquid and solid foodstuffs or homologous materials.

Another object of the invention is to provide a method and apparatus for drying malodorous foodstuffs so that the objectionable odors resulting therefrom will be substantially confined to said apparatus.

Another object of the invention is to provide a method and apparatus for drying materials such as food products or the like by means of a gaseous drying medium continuously re-circulated in an enclosed system.

Materials such as vegetables or the like are ordinarily dried by the action of a current of warm air. The system commonly employed is one in which a current of air is heated and passed through a drying zone over the materials being dried, the air tending to absorb moisture from said material. In order to remove this absorbed moisture from the system so that the air is partially unsaturated so as to be able to absorb a further quantity of moisture when it again contacts the material, a vent is provided in the drying zone to remove a portion of this liquid-laden air from the system. The remaining air from the drying zone is drawn into a heater along with fresh atmospheric air, making up for the vented air, and re-circulated through the drying zone. It will be appreciated that the relative humidity of the atmospheric air continuously admitted to the drying system will vary over a considerable range during a 24-hour drying day, and the maintenance of a uniform relative humidity of the air to which the foodstuff is exposed will require considerable compensating adjustment of the controllable operating factors, such as the proportion of admitted air, degree of heating thereof, et cetera. According to the present process, a desirable drying atmosphere is established in a drying system, controlled to an advantageous relative humidity, and maintained in such controlled condition throughout the drying cycle without requiring the removal or supply of atmospheric or other gases. However, when the process is carried out in an apparatus which is not absolutely air-tight, as is ordinarily the case, there will be some outward leakage of gas from the system at certain stages of the process and some inward leakage of air at other stages, as pointed out hereinafter.

Foodstuffs dried according to the conventional drying processes, involving the use of atmospheric air as the drying medium, generally exhibit an important loss in the above-mentioned accessory food factor content, which is obviously objectionable. This loss is believed to be occasioned by oxidation processes whereby a detrimental chemical change in such food factors is caused to take place, and thus the essential accessory food factors lose their identity. This loss is particularly noticeable with respect to vitamins.

The method of the present invention may comprise, essentially, establishing an enclosed drying zone within which material to be dried may be disposed, and passing a heated gaseous drying medium in contact with such material to evaporate liquid therefrom, subjecting such drying medium to a cooling operation to remove liquid therefrom by condensation of vapor produced by such liquid evaporation, re-heating the cooled gaseous medium, and re-circulating the heated medium in contact with said material to evaporate a further quantity of liquid therefrom. According to the preferred practice of the invention, the drying system is maintained in substantial isolation from the atmosphere, and a non-detrimental gas is employed as the drying medium. The non-detrimental gas may comprise substantially any non-toxic, non-oxidizing gaseous material and, as it has also been found that an acid atmosphere further inhibits the above oxidation processes, a cheap and readily available acidic gas such as carbon dioxide or other acidic gas, such as $SO_2$, or mixtures of $CO_2$, $SO_2$, or other acidic gas with an inert or non-detrimental gas, such as nitrogen, is very advantageous. The presence of a relatively large proportion of the non-detrimental gas is highly important in the early stages of the drying operation, and according to the preferred practice of the invention the drying atmosphere consists substantially wholly of such non-detrimental medium during such early stages. As the drying of the material progresses, however, the susceptibility of the accessory food factor content to damage by the drying operation is materially lessened, so that the presence of such non-detrimental medium becomes less and less necessary, until, near the end of the drying cycle, ordinary atmospheric air is quite permissible.

The apparatus of this invention may comprise, essentially, an enclosed drying chamber adapted to receive a charge of material to be dried, which material may be disposed in such manner as to provide maximum contact therewith by the drying medium, a drying medium cooling means and a heating means, together with suitable conduit means and circulating means whereby a gaseous drying medium may be forced through the drying chamber, cooler and heater in series relation. Means are preferably also provided for admitting a desired gaseous drying medium to the apparatus, preferably in such manner as to displace atmospheric air therefrom.

Other objects of the invention will be brought out in the following specific description of the method and apparatus, or will be apparent therefrom. The accompanying drawings illustrate an embodiment of the invention, and referring thereto:

Fig. 1 is a side elevation of the apparatus;

Fig. 2 is a partly broken-away plan view thereof;

Fig. 3 is an enlarged sectional detail thereof, taken on line 3—3 in Fig. 2;

Fig. 4 is a further detail thereof, taken on line 4—4 in Fig. 2;

Fig. 5 is a further detail thereof, taken on line 5—5 in Fig. 4; and

Fig. 6 is a front elevation of the apparatus.

Referring to the drawings, and to Fig. 2 in particular, the complete apparatus may comprise a drying means A, and indirect heating means B, a circulating means C and cooling means D, the several elements of the apparatus being placed in closed-circuit communication through the agency of suitable ducts or the like as will be more fully described hereinafter.

The indirect heating means B shown in Figs. 2, 4, and 5 may comprise a plurality of heating units 1, 2, and 3 provided with inlet and outlet ducts 4 and 5 respectively, for the circulation of the gaseous drying medium in contact with the heating portions of said units. The inlet duct 4 is preferably provided with a plurality of partitions 16 and 17 defining a plurality of passages 18, 19, and 20 in which the heating units 1, 2, and 3 may be respectively disposed. One of such units is illustrated in Fig. 4 on a somewhat enlarged scale, the heating portion of which may comprise a plurality of elongated thin-walled fire tubes 6 disposed in the passage 18 and communicating at their lower ends with a combustion chamber 8 provided with burner means 9, and communicating at their upper ends with an outlet header 11 and a stack 12. The units, 1, 2, and 3 may be provided with a casing 7, which is preferably suitably insulated as at 14, and if desired a passage 15 may be provided extending through the header 11 in order to expose more heating surface to the gaseous drying medium.

The drying means A may comprise an elongated chamber or tunnel 21 provided with communication at one end to the outlet duct 5 of the heating means B through a suitable conduit 22 and with communication at the other end to the circulating means C. The chamber 21 is adapted to receive a plurality of wheeled trucks 23 each carrying a plurality of suitable trays or the like such as are indicated in dotted lines at 24 in Fig. 5, upon which the material to be dried may be distributed. The several trays 24 are preferably spaced from one another vertically according to conventional practice, and where a solid foodstuff is to be dried, may be provided with foraminous bottoms or the like, whereby optimum contact of the gaseous drying agent with the material may be secured. The chamber 21 is also provided with a closely fitting door 25 which may be opened to permit removal of the trucks 23 at the completion of a drying cycle. Suitable guide grooves may be provided in the floor of the chamber 21, as shown at 19, to guide the wheeled trucks longitudinally of the chamber. The walls of the chamber 21 are preferably provided with a suitable thickness of heat insulating material to maintain the heat efficiency of the apparatus at a desired high level.

The cooling device D may comprise a casing 31 in communication at one end with the circulating means C through a suitable duct 32 and in communication at the other end with the heating means B. Suitable means are provided within the casing 31 for cooling at least a portion of the humid gaseous drying medium supplied by the circulating means C and such cooling means may comprise a condenser 33 preferably disposed centrally of said casing adjacent the inlet end thereof in such manner as to define by-pass passages 34 and 35 at the sides thereof, and the device preferably further comprises baffle means 36 and 37 positioned rearwardly of the condenser 33 and the passages 34 and 35, with respect to the flow of drying medium, to provide a thorough intermixing of the cooled and by-passed drying medium before introduction thereof to the heating means B.

The condenser 33 is preferably of the evaporation-cooled type and may comprise a plurality of longitudinal passages 38 open at their ends and extending in the direction of flow of the gaseous drying medium, said passages being preferably provided with suitable heat-distributing means such as a corrugated metal plate 39 disposed in each of said passages to define a plurality of smaller passages 38a. The plates 39 may be secured to the side walls 41 of the passages 38 by soldering or the like, if desired, to facilitate heat transfer between the drying medium and said side walls. The condenser further preferably comprises a plurality of cooling passages 42 extended vertically through the condenser, alternating with the passages 38, which may also be provided with heat distributing means such as corrugated plates 43 after the manner described in connection with the passages 38, and means are preferably provided for passing a current of air through the passages 42 and for maintaining the wall surfaces of said passages in contact with water or other cooling fluid, which is continually cooled by evaporation due to continual flow of air in contact therewith. For this purpose a blower may be provided as at 44, mounted in any convenient manner as, for example, above the drying chamber 21, said blower communicating with the upper end of the casing 31 through a suitable duct 45. Water spray means are preferably provided above the condenser 33 and may comprise suitable spray nozzles 46 and 47 disposed in the conduit 45. The air passed through the passages 42 may be vented to the atmosphere through a suitable outlet duct 48 which may be provided with a suitable liquid trap 49 and a drain 50 for removing water that may accumulate in the duct 48. It will be appreciated that the inlet duct 45 and the outlet duct 48 will be suitably connected to the passages 42 in such manner as to prevent escape of the gaseous drying medium from the casing 31.

Suitable means such as dampers 52 and 53 are preferably provided in the by-pass passages 34 and 35 for controlling the relative proportions of gaseous drying medium by-passed and passed through the condenser, and the baffles 36 and 37 are preferably so arranged within the rearward portion of the casing 31 as to thoroughly intermix the two portions of drying medium, without unduly hindering the flow of such medium through the device. Furthermore, suitable drains are provided in the bottom of the cooling means D as at 54 and 55, the purposes of which will be subsequently brought out in connection with the description of the operation of the device.

Certain other accessory apparatus, such as indicating devices, control means and the like may also be provided, as will be more fully brought out hereinafter.

In the operation of the device, the chamber 21 is charged with the desired number of trucks carrying the desired quantity of foodstuffs or other material to be dried and the door 25 is properly sealed. The desired gaseous drying medium is then introduced to the apparatus at any suitable point, as through an inlet conduit 56 in the duct 22, displacing the major portion of the atmospheric gases present in the system as a result of opening the chamber 21 to the atmosphere during the charging operation. Where the preferred gaseous drying medium of this invention, namely, carbon dioxide, is employed, a substantially complete displacement of the atmospheric gases may be obtained due to the high density of carbon dioxide which will flow through the device and displace such atmospheric gases much in the same manner as water may be caused to displace oil. The carbon dioxide may be obtained from any source, such as liquid or solid carbon dioxide in pressure containers. The displaced gases are preferably removed from the system at the highest level therein, as through a suitable conduit 57, and in this connection the duct 22 is preferably raised above the level of the chamber 21 to provide a high point in the system as well as to provide for introduction of gaseous drying medium to one side and the top of the drying chamber. The gases discharged from the conduit 57 may be tested from time to time to determine the carbon dioxide content thereof, and when a sufficiently high concentration of carbon dioxide has been reached in the system, the introduction thereof may be discontinued and the circulating means C, which may comprise a blower of the conventional type suitably operated by an electric motor or the like, is placed in operation and the burners 9 are lighted.

Circulation of the gaseous drying medium through the system will thus be established in the direction indicated by the arrow F in Fig. 2, and as the temperature of such medium is gradually raised, the desired drying effect will be produced within the chamber 21. The humid drying medium conveyed to the device D is partially cooled by passing a desired portion thereof through the condenser 33 and, depending upon the setting of the dampers 52 and 53, a controlled chilling of such humid gases is effected. The chilling which takes place within the condenser 33 will cause condensation of a portion of the condensable material from said drying medium which condensate will drain to the bottom wall of the casing 31 and escape through the drains 54 and 55 which are preferably provided with fluid seals as indicated at 54a and 55a. The chilled drying medium from the condenser 33, upon meeting the unchilled drying medium by-passed through 34 and 35, will be more or less completely intermixed with such unchilled portions through the agency of the baffles 36 and 37 and subsequently passed through the heating means B, re-heated and introduced to the drying chamber 21 in a continuous practice of the drying process.

In order to control the temperature conditions in the system, I preferably provide a thermostatic control means adjacent the outlet duct 5 of the heating means B, said control means, generally indicated at 58, being conveniently associated with the fuel supply means for the burners 9 according to conventional practice, whereby a condition of excessive temperature at the outlet end of said heating means will cause lowering of the fires within the heating units. Suitable thermometers may be disposed at various locations in the system, as at 61, 62, 63, and 64 whereby the temperature of the gaseous drying medium may be observed.

In view of the fact that the temperature of the drying medium supplied to the chamber 21 is preferably maintained within a certain range, to prevent overheating of the material in such chamber, I preferably provide means for decreasing the heating effect of the units 1, 2, and 3 in the event that the circulating means should fail to produce the desired velocity flow in the system. Such means may comprise, for example, a velocity-responsive member located in the circulatory system at any suitable point and operatively associated with the burners 9 of one or more of said units. If desired, a portion of the system may be constricted, as at 65, and a pivotally mounted vane member 66 disposed therein at such constricted portion, said vane being movable between the dotted position 66 shown in Fig. 1 and the projecting dot-dash position shown at 66a in Figs. 1 and 2 in response to the velocity of the drying medium at such constricted portion. The operative association of the vane with the gas supply for the burners 9 may be effected in any convenient manner, according to methods well known to those skilled in the art.

It will be appreciated that other forms of cooling means may be used without departing from the spirit of this invention, although I find the construction above described particularly advantageous because I am able to run the blower 44 at an advantageous speed and to set the water sprays 46 and 47 for a desired flow and to then control the de-humidifying action in the cooling means D by regulating the relative amount of gaseous drying medium flowing through the by-pass passages 34 and 35 and the condenser 33 by adjusting the dampers 52 and 53. This type of cooler is relatively inexpensive to build since the condenser portion thereof is relatively small, and is also advantageous because a relatively large portion of the gaseous drying medium may be run through the by-pass passages so that the draft losses in the cooler will not be unnecessarily high and also because the dampers 52 and 53 offer a convenient means for controlling the de-humidifying action therein.

The complete drying system may be constructed in such manner as to be completely gas-tight so that there is no efflux or influx of gas or vapor during the drying procedure, but such construction would obviously be quite expensive and somewhat difficultly maintained in gas-tight condition. When a drying operation is started, the vapors or gas present in the system will be substantially at atmospheric temperature and pressure, and were the system gas-tight there would be a noticeable increase in pressure as the gas becomes heated in carrying out the drying process. If the system is not definitely air-tight, this increase in pressure will be dissipated to the atmosphere, but no important change in the character of the original gaseous drying medium will result. The maximum pressure effects in the system will be realized when the gaseous drying medium is brought to maximum temperature and maximum saturation, and as the drying progresses the saturation of the gaseous drying medium will diminish due to removal of volatile liquid from the material undergoing drying, which decrease in saturation will cause a lowering of the total pressure in the system and atmospheric air will be drawn into the device. This does not occur until the drying process is approaching completion, at which point in the drying process the above-mentioned accessory food factors and other constituents of the organic material above-mentioned will be less subject to chemical change due to the presence of an oxidizing atmosphere. In view of the above, therefore, while I preferably start the drying operation with a drying atmosphere which is sufficiently non-oxidizing to be substantially non-detrimental to the accessory food factors, et cetera, the drying atmosphere may increase in oxidizing power in the later stages of the drying operation due to the above-mentioned influx of atmospheric air, but at the same time the resistance of the aforesaid accessory food factors, et cetera, will be materially increased, so that the gaseous drying medium is in effect continuously non-oxidizing with respect to such factors throughout the drying procedure.

When certain malodorous materials such as onions or garlic are being dried according to conventional drying practice, the atmosphere surrounding the drying chamber is thoroughly contaminated by the constant evolution of the volatile odor-forming constituents which are discharged directly to the atmosphere. When such materials are dried in the present apparatus according to the method of my invention, there is a relatively small amount of such odor-forming materials actually discharged to the atmosphere and a considerable proportion thereof collects with the condensate removed from the system at 54 or 55, whereby the atmospheric pollution attendant on the drying of materials such as onions or garlic is reduced to a negligible minimum.

The process of the present invention, as above pointed out, is applicable to the drying of numerous organic materials other than foodstuffs, particularly tobacco, spices, and the like. The value of tobacco depends primarily upon its content of flavor and aroma producing constituents, and when such an organic material is dried according to the present method, the dried material will contain a much higher proportion of its original content of such constituents than though it were exposed to uncontrolled drying according to the standard processes.

I claim:

1. The method of drying organic materials, which comprises: passing a heated gaseous drying medium in contact with such materials in an enclosed drying chamber to evaporate liquid therefrom; removing said drying medium together with evolved vapor from said chamber; subjecting a portion of such removed drying medium to a cooling operation to separate liquid therefrom by condensation of a portion of such vapor; recombining such cooled portion of drying medium with the remainder of such removed drying medium under conditions of turbulence; re-heating such recombined drying medium; and recirculating the re-heated drying medium in contact with said materials to evaporate a further quantity of liquid therefrom.

2. In a drying apparatus including an enclosed drying chamber, a vapor heating means, vapor cooling means, and circulating means associated with said chamber for withdrawing vapor therefrom, passing the same through said cooling means and through said heating means and re-introducing the same into said chamber in a closed-circuit system, a vapor cooling means which constitutes the aforesaid vapor cooling means and which comprises: a condenser provided with vapor-passages, casing means enclosing said condenser and defining a vapor by-pass passage, damper means in said by-pass passage for controlling the relative proportion of vapor passed through said condenser and said by-pass passage by said circulating means, baffle means within said casing means and positioned rearwardly of said condenser means in the direction of flow of vapor through said cooling means, said baffle means being positioned to cause intermixing of vapors passed through said condenser and said by-pass passage before passage of said vapors through said heating means.

ARTHUR E. WIGELSWORTH.